March 31, 1970  B. J. O'NEILL  3,503,676
EYEGLASSES WITH TEMPORAL BONE BEARING AUXILIARY BOWS
Filed Sept. 5, 1968
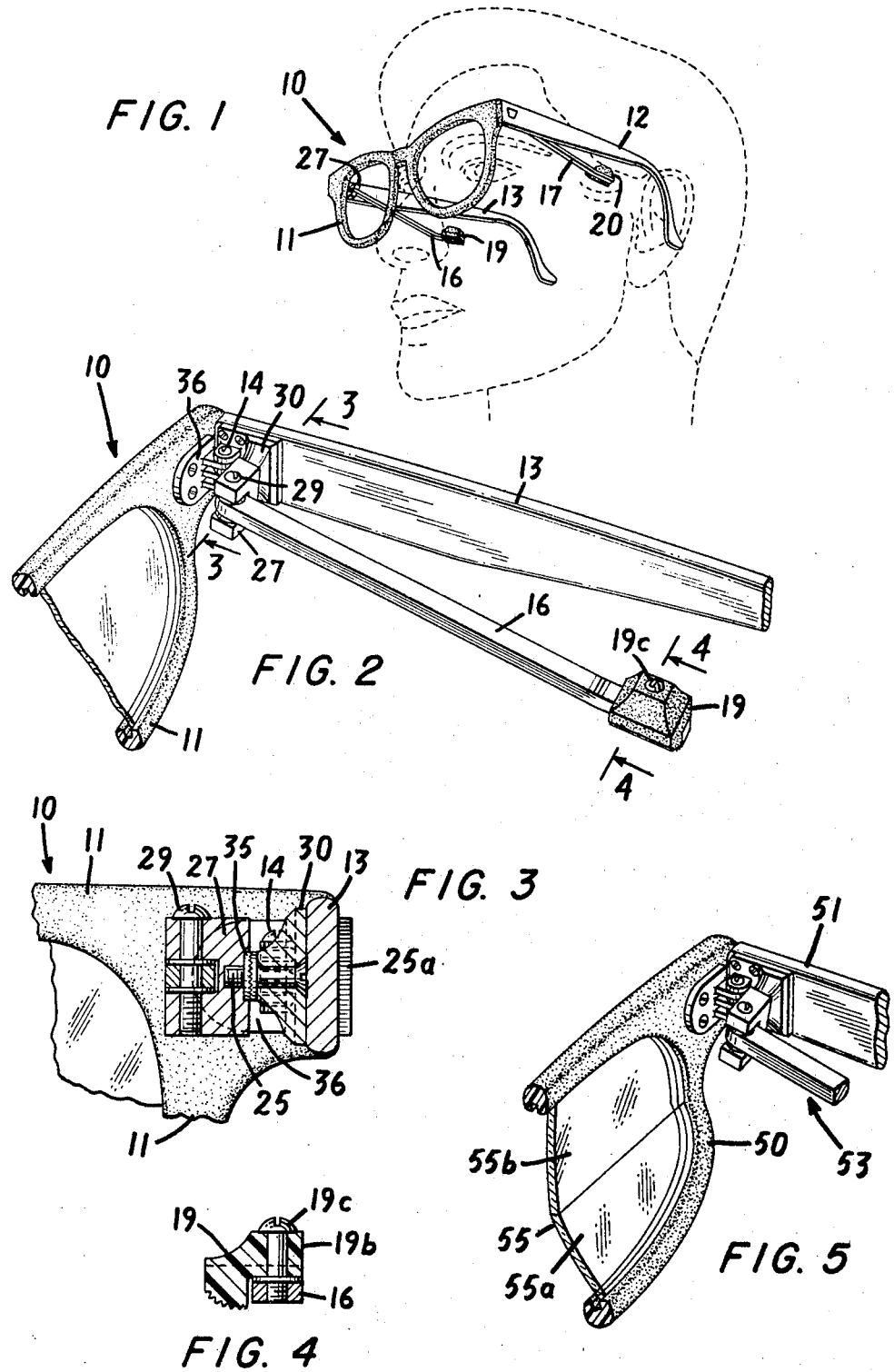

United States Patent Office 3,503,676
Patented Mar. 31, 1970

3,503,676
EYEGLASSES WITH TEMPORAL BONE BEARING AUXILIARY BOWS
Bert J. O'Neill, Bayside, N.Y.
(11 Center St., Greenport, N.Y. 11944)
Continuation-in-part of application Ser. No. 470,970, July 12, 1965. This application Sept. 5, 1968, Ser. No. 757,659
Int. Cl. G02c 5/14
U.S. Cl. 351—123      1 Claim

ABSTRACT OF THE DISCLOSURE

Eyeglasses are supported free of the nose of a wearer by two auxiliary bows which are designed to rest upon the temporal bones of the wearer's head. Each auxiliary bow is attached to the inner forward portion of the usual ear-engaging bow by a pivot mechanism which allows the position of the free end of the auxiliary bow to be adjusted.

---

This application is a continuation-in-part of my application Ser. No. 470,970 filed July 12, 1965, now abandoned. This invention related generally to eyeglasses and more particularly to eyeglasses whereby the eyeglass frame is held out of contact with the nose.

Eyeglasses are known in which the assembly is supportable on the bridge of the nose of the user or otherwise supported on the face of the wearer, for example the cheeks or cheek bones of the wearer. The known eyeglasses supported free of the nose cannot be adjusted readily and generally have the rest point on a part of the face of the wearer which is uncomfortable and which will not maintain the eyeglasses in a desired position.

It is a principal object of the present invention to provide eyeglasses adjustably positionable to rest on the temple bone of the user free of he bridge of the nose thereof.

The eyeglasses according to the invention are provided with auxiliary bows or bars, one each for each regular or principal frame bow or temple of the eyeglass or lens frame. Each auxiliary bow or bar is pivoted at a point or position closer to the lens frame than to the free end of extremity of the frame bow and is variably adjustable upwardly and downwardly so that the free end of the auxiliary bar can be moved with reference to the eyeglass or frame bows. The free extremity of each bow is variably movable inwardly relative to its lens frame bow.

The features and advantages of the eyeglasses in accordance with the present invention will be better understood as described in the following specification and dependent claim, in conjunction with the following drawings in which:

FIG. 1 is a perspective view of the eyeglasses in use on a wearer illustrated in phantom;

FIG. 2 is a fragmentary perspective view of eyeglasses provided with the invention;

FIG. 3 is a section view taken along section line 3—3 of FIG. 2;

FIG. 4 is a section view taken along section line 4—4 of FIG. 2; and

FIG. 5 is a fragmentary perspective of eyeglasses provided with a lens and auxiliary bar according to the invention;

As illustrated in the drawings, eyeglasses 10 comprise a lens frame 11 having bows or temples 12, 13, pivotally mounted with a hinge 14 secured to the lens frame 11 by a hinge plate 36 so that the eyeglasses can be folded in known manner. The bows or temples 12, 13 each has mounted thereon an auxiliary bow or bar 16, 17. The construction and bar mounts or pivots are illustrated in the drawing with the bars 16, 17 in use extending longitudinally downward away from the individual respective bows 12, 13 and away from the lens frame and in a direction toward the free end or extremity of the individual bows which cooperates with a respective ear on the head of a wearer. Each auxiliary bar has a free end or extremity on which a temporal base piece 19, 20 rests on the temporal bone of the wearer, as illustrated in FIG. 1. With the temporal base piece resting on the temporal bone as a pivot point, the lens frame 11 is supported out of contact with the nose of the wearer as shown. The respective base pieces are made of a resilient pad 19b mounted by a screw 19c on the respective bow as illustrated in FIG. 4.

Provision is made for adjusting the downward position of the individual temporal base pieces 19, 20 relative to the respective bows by hinge means, only one of which will be described, comprising a pivot pin 25 extending through a respective bow and having a knurled head 25a. The pin 25 is threaded and is received in a threaded hole of a U-shaped pivot support member 27 into which extends the auxiliary bar and is pivotally held therein by a pivot pin 29 allowing the pivot support piece 27 to allow movement of the auxiliary bar inwardly toward the temporal bone of the head of the wearer or away therefrom and toward and away from the respective bow or eyeglass temple. The pivot support piece 27 is adjustable angularly with respect to a spacer 30 disposed on the inner side of the bow or temple and mounted with the pin 25 extending therethrough. Thus the pivot support piece 27 is rotatable angularly about the pivot pin 25, as later described, and the individual auxiliary bar may thus be moved upwardly and downwardly.

In order to allow for the upward and downward movement of the individual auxiliary bars, and therefore each respective temporal base piece, two jaws 35 are provided. The jaws are mounted on the spacer 30 and pivot piece 27, as illustrated, respectively. These jaws have axially extending complementary teeth which retain the pivot piece 27 in fixed angular position once the desired angular position of the respective auxiliary bar relative to the bow or temple has been set. By slackening off on each pivot pin 25 the jaws of the respective hinge means are disengageable and the desired angular position of each bar can then be set. The pin head 25a is rotated or unscrewed to separate the two jaws 35 and the one jaw which is fixed to the pivot support piece is rotated angularly relative the other jaw by moving the auxiliary bar upwardly and downwardly adjusting the jaws into a desired relative position after which they are clamped in a teeth-engaging position by tightening the pin 25 so that the set position of each of the auxiliary bars is retained. This sets the downward position of the temporal base piece and the individual bow then only freely pivots inwardly toward the face of the user or away therefrom. The jaw mechanism thus provides for easily adjusting the desired position of the base pieces on the temporal bone of the user and the exact out-of-contact position of the lens frame 11 from the nose of the head of the wearer.

Those skilled in the art will understand that the bar and the pivot mechanism may be provided separately from eyeglasses mounted on known eyeglass frames. Moreover, the eyeglass or lens frame may be of any type, so long as there are bows or temples on which the mount structure for the auxiliary bars can be mounted in the manner illustrated.

Provision is made for bi-focal eyeglasses in the invention, as illustrated in FIG. 5 in which lens frame 50 is provided with bows 51, only one of which is shown, each supporting an auxiliary bar or temple mechanism 53 of the type heretofore described. The eyeglasses in this case are provided with bi-focal lens 55, in which case the auxiliary temple or bar mechanism 53 can be adjusted for holding the lens frame out of contact of the nose of the user and in optimum position for the user to look through reading lens 55a and otherwise viewing lens 55b along a path or line of sight about at an angle of 90° or normal to the individual lens portions without discomfort and with optimum position of the head of the user in reading or otherwise simple viewing.

The eyeglasses according to the invention rest comfortably on the pivot points provided by the temporal bone base pieces once their angular position has been set. Moreover, the inward position of the base pieces is set since the pivot pins 29 cause enough frictional resistance between the bows the pivot pins and the support pieces 27 so that the set inward positions of the base pieces is well retained. Furthermore the entire pivot mechanism allows folding of the eyeglasses without obstruction by the auxiliary bows or temples. The auxiliary bows themselves are substantially rigid but they may be bent if desired.

While preferred embodiments of the invention have been shown and described, it will be understood that many modifications and changes can be made within the true spirit and scope of the invention.

What I claim and desire to secure by Letters Patent is:

1. Eyeglasses comprising a lens frame and two laterally extending ear-engaging bows each having a free end portion to cooperate with a respective ear on the head of a wearer for supporting the eyeglasses on the head of the wearer, the improvement which comprises, for each ear-engaging bow an auxiliary bow attached to the ear-engaging bow extending generally longitudinally in a direction toward the free end portion of the ear-engaging bow, each auxiliary bow having a free end with a temporal base piece on the auxiliary bow adjacent said free end for engaging and resting on a respective temporal bone of the wearer to cooperate with the ear-engaging bow to support the eyeglasses on the wearer free of the nose of the wearer, pivot mechanism for each auxiliary bow pivotally attaching one end of the auxiliary bow on an inner side of a respective ear-engaging bow at a position closer to said lens frame than to the free end portion of the ear-engaging bow, said pivot mechanism comprising means for variably positioning the free end of each respective auxiliary bow inwardly in a direction toward the opposite bow, and mutually engageable and disengageable jaws for variably positioning the free end of each auxiliary bow downwardly with respect to the ear-engaging bows so that each temporal base piece rests upon the corresponding temporal bone of the wearer.

References Cited

UNITED STATES PATENTS

| | | | |
|---|---|---|---|
| 65,800 | 6/1867 | Edmonson | 351—172 X |
| 508,457 | 11/1893 | Wickliffe | 351—123 |

DAVID SCHONBERG, Primary Examiner

JOHN W. LEONARD, Assistant Examiner

U.S. Cl. X.R.

351—111